(12) United States Patent
Sojka et al.

(10) Patent No.: US 11,710,867 B2
(45) Date of Patent: Jul. 25, 2023

(54) METHOD TO OPEN UP ELECTRO CHEMICAL ENERGY STORAGE DEVICES AND THERMAL TREATMENT SYSTEM

(71) Applicant: Accurec Recycling GmbH, Krefeld (DE)

(72) Inventors: Reiner Sojka, Düsseldorf (DE); Albrecht Melber, Darmstadt (DE)

(73) Assignee: ACCUREC RECYCLING GMBH, Krefeld (DE)

( * ) Notice: Subject to any disclaimer, the term of this patent is extended or adjusted under 35 U.S.C. 154(b) by 275 days.

(21) Appl. No.: 17/118,295

(22) Filed: Dec. 10, 2020

(65) Prior Publication Data

US 2021/0184283 A1 Jun. 17, 2021

(30) Foreign Application Priority Data

Dec. 11, 2019 (DE) ..................... 10 2019 133 927.8

(51) Int. Cl.
 C22B 1/00 (2006.01)
 H01M 10/54 (2006.01)
 C22B 7/00 (2006.01)

(52) U.S. Cl.
 CPC ............. *H01M 10/54* (2013.01); *C22B 1/005* (2013.01); *C22B 7/005* (2013.01)

(58) Field of Classification Search
 CPC ........ C22B 1/005; C22B 7/005; H01M 10/54; Y02W 30/84
 See application file for complete search history.

(56) References Cited

U.S. PATENT DOCUMENTS

| 5,735,933 A | 4/1998 | Yokoyama et al. |
| 2008/0050295 A1 | 2/2008 | Uchida et al. |

(Continued)

FOREIGN PATENT DOCUMENTS

| CN | 108565523 A | * | 9/2018 | ............. C22B 1/005 |
| CN | 109193058 A |   | 1/2019 | |

(Continued)

OTHER PUBLICATIONS

Hu et al., Recycling Device And Method For Waste Lithium-ion Battery Electrolyte, Sep. 2018. See the Abstract. (Year: 2018).*

(Continued)

*Primary Examiner* — Cynthia H Kelly
*Assistant Examiner* — Monique M Wills
(74) *Attorney, Agent, or Firm* — Polson Intellectual Property Law, PC; Margaret Polson; Christopher Sylvain

(57) ABSTRACT

A method for breaking down electrochemical energy storage devices in conjunction with a subsequent reclamation of recyclable materials contained therein as secondary raw materials. The devices are broken down by a thermal treatment in a negative pressure environment in a process chamber to remove electrolyte and reactive substances, before the thermally treated material is subjected to downstream processing, by which the secondary raw materials are separated from one another. After introducing a batch of storage devices, in a first process step, the process chamber is evacuated with simultaneous heating of the devices to a first temperature level such that electrolytes in the devices evaporate and, due to the resulting vapor pressure, the devices are opened, wherein produced process gases containing electrolytes in the vapor phase are withdrawn from the process chamber. The devices are then heated to a second temperature level for further breakdown with a simultaneous pressure increase in the process chamber in a reducing (Continued)

atmosphere, before the chamber is ventilated and cooled and the broken down devices are removed, wherein the pressure increase is monitored during this second process step so that it increases continuously. Also, a thermal treatment system for removing electrolytes and reactive substances in electrochemical energy storage devices, thus for pyrolytically breaking them down.

12 Claims, 2 Drawing Sheets

(56) References Cited

U.S. PATENT DOCUMENTS

| | | |
|---|---|---|
| 2014/0017621 A1 | 1/2014 | Iida et al. |
| 2015/0147709 A1 | 5/2015 | Isomura et al. |
| 2018/0026318 A1 | 1/2018 | Shin et al. |
| 2019/0260101 A1 | 8/2019 | Hanisch |

FOREIGN PATENT DOCUMENTS

| | | |
|---|---|---|
| JP | 2016022395 A | 2/2016 |
| JP | 2016022395 A | 8/2016 |

OTHER PUBLICATIONS

Office Action dated Dec. 17, 2 019 in related German application DE102019133927.8.

ACCUREC Recycling Gesellschaft mbH: Weyhe, R. T.; Melber, A.: Demonstration system for a cost-neutral, resource-efficient processing of disused Li-Ion batteries for electromobility—EcoBatRec: Final report on the joint project. Mulheim, 2016. https://doi.org/10.2314/GBV:872637352.

U.S. Appl. No. 17/118,305 filed Dec. 10, 22020, applicant Accurec Recycling GmbH Per MPEP rule 609.07.

Extended European Search Report dated May 1, 2021 in related European application 20211220.7.

* cited by examiner

METHOD TO OPEN UP ELECTRO CHEMICAL ENERGY STORAGE DEVICES AND THERMAL TREATMENT SYSTEM

CROSS REFERENCE TO RELATED APPLICATION

This application claims priority from German application 10 2019 133 927.8 filed Dec. 11, 2019, which is incorporated by reference herein.

BACKGROUND

The present disclosure relates to a method for opening up electrochemical energy storage devices in conjunction with a subsequent reclamation of recyclable materials contained therein as secondary raw materials, in which method the energy storage devices are broken down by thermal treatment in a negative pressure environment in a process chamber to remove the electrolyte and reactive substances, before the thermally treated material is subjected to processing in a downstream process, by which secondary raw materials in the thermally treated material are separated from one another.

Electrochemical energy storage devices are rechargeable batteries, such as lithium-ion batteries, nickel-metal hydride batteries, and electrolytic capacitors. Such energy storage devices, in particular lithium-ion batteries, are used as so-called stand-alone batteries, but to a greater extent also in the form of battery modules for operating electrical consumers, such as mobile computers, cell phones, power tools, and, increasingly, also in conjunction with electromobility, used particularly with respect to automobiles. The electrochemical energy storage devices that are used for motor vehicles must have a high storage density and be able to store the required power. In many cases, these energy storage devices are high-voltage batteries.

The increasing use of such electrochemical energy storage devices, which can be observed worldwide, especially in conjunction with increasing electromobility, results in a growing number of worn-out energy storage devices, so-called end-of-life batteries or battery modules. The higher production rates to meet the increased demand have the result that the production waste also increases in terms of quantity. In addition, the natural resources from which the elements required to produce such energy storage devices are obtained are limited. Against this background, various approaches have been proposed to recover the raw materials contained therein as secondary raw materials from the no longer usable electrochemical energy storage devices— namely end-of-life batteries or battery modules as well as production waste. In order for such a process to be able to establish itself on the market, it has to be controllable and feasible at reasonable costs. In addition, such a process has to be capable of treating larger quantities, several thousand tons per year.

The thermal reactivity is not unproblematic in such electrochemical energy storage devices, in particular when they are lithium-ion batteries. Damage to such an energy storage device can easily lead to ignition thereof. Due to their design, such energy storage devices can contain a relatively high residual charge. In order that subsequent shredding steps can be carried out safely, the electrochemical energy storage devices first have to be deactivated by discharging. This takes place by way of an actively induced discharge process. For this purpose, the energy storage devices are placed, for example, in a discharge liquid or in a discharge granulate. In order to ensure discharge in discharge liquid, the energy storage devices first have to be opened mechanically so that the discharge liquid can penetrate into the housing, since the battery or battery module contacts oxidize in the discharge liquid and suppress the desired discharge process even after a short time. It is also known to use the thermal reactivity of the energy storage devices in conjunction with a thermal treatment thereof. In this way, at least part of the energy required for thermal (pyrolytic) treatment of the energy storage devices can be acquired from them.

For the thermal treatment of electrochemical energy storage devices, a vacuum furnace can be used, in which the thermal breakdown takes place. This is kept at a constant low pressure of less than 10 mbar over the entire thermal treatment period. The gases withdrawn from the heated process chamber are fed to process exhaust gas processing for purifying the process exhaust gases. The problem with such a thermal breakdown of electrochemical energy storage devices, in particular of lithium-ion batteries, is that the temperature in the process chamber can rise very sharply in a very short time due to the residual discharge. Temperatures can be reached in this case at which secondary raw materials to be reclaimed, such as aluminum components, melt. This is not desirable, as it makes the downstream processing to reclaim the secondary raw materials more difficult. To ensure operational safety, such a vacuum furnace is equipped with safety systems. This primarily comprises monitoring the pressure in the process chamber which must not exceed a predetermined value. The goal is to keep the internal pressure in the process chamber below 80 mbar. This safety concept includes that if a predetermined internal pressure is reached in the process chamber, for example 65 mbar, further heating is deactivated. If a second pressure is exceeded, which is somewhat greater than the first pressure at which the heating is deactivated, the process chamber is cooled. This takes place, for example, if a pressure of approximately 80 mbar is determined in the process chamber. When a higher pressure is reached within the process chamber, it is concluded that the vacuum pump has failed and an emergency pump is operated. A thermal treatment system of this type is known from the "Demonstrationsanlage für ein kostenneutrales, ressourceneffizientes Processing ausgedienter Li-Ionen-Batterien der Elektromobilität" ["Demonstration system for a cost-neutral, resource-efficient processing of worn-out Li-ion batteries for electromobility"]—the final report on the EcoBatRec joint project. A similar method is known from CN 109193058 A.

U.S. Pat. No. 5,735,933 A discloses a method for breaking down electrochemical energy batteries. These are thermally treated without prior mechanical breakdown. The batteries are first heated to a temperature between 100° C. and 160° C. in a vacuum furnace. In addition, a vacuum is created in the furnace. After the preheating, the battery is heated step-by-step to predetermined temperature levels. When each of these temperature levels is reached, the gases occurring in the furnace are aspirated. To avoid oxidation of the metals contained in the batteries, it is proposed that a reducing gas, for example hydrogen, be introduced into the furnace.

Even if a thermal breakdown of electrochemical storage devices, in particular lithium-ion batteries, can in principle be carried out satisfactorily in such a vacuum furnace before the thermally broken down energy storage devices are fed to processing for separating the secondary raw materials to be recycled, it would be desirable if the breakdown method could be improved, especially with regard to its process economy.

The foregoing examples of related art and limitations therewith are intended to be illustrative and not exclusive. Others will become apparent to those skilled in the art upon a reading of the specification and a study of the drawings.

SUMMARY

The following embodiments and aspects thereof are described and depicted in conjunction with systems, tools and methods which are meant to be illustrative, not limiting in scope. In various embodiments, one or more problems have been reduced or eliminated, while other embodiments are directed to other improvements.

Proceeding from this background, an aspect of the present disclosure is based on refining the process of breaking down electrochemical energy storage devices, in particular lithium-ion batteries, in a negative pressure process chamber, particularly with regard to improving the process economy.

This is achieved by a generic method of the type mentioned at the outset, in which after introducing a batch of energy storage devices to be thermally broken down into the process chamber, in a first process step, the process chamber is evacuated while simultaneously heating the energy storage devices to a first temperature level enough that electrolytes contained in the energy storage devices evaporate and, as a result of the resulting vapor pressure, the energy storage devices are opened, wherein produced process gases containing electrolytes in the vapor phase are withdrawn from the process chamber, and following the first process step, the energy storage devices are heated in reducing atmosphere to a second temperature level with simultaneous pressure increase in the process chamber for the further breakdown, before the process chamber is ventilated, cooled, and the broken down energy storage devices are removed, wherein the pressure increase in the process chamber is monitored during the second process step, so that it increases continuously.

This is also achieved with a thermal treatment system described herein.

In the method for thermally breaking down electrochemical energy storage devices, in particular lithium-ion batteries, after a first process step in which the electrolytes contained in the energy storage devices have been brought into the vapor phase and in which the energy storage devices have been opened due to the vapor pressure—in a departure from a prevailing teaching—a pressure increase is carried out in the process chamber in the subsequent second process step. The pressure increase can take place in the second process step up to atmospheric pressure. In any case, this second process step ensures a pressure increase at which the pressure in the process chamber exceeds at least 300 to 400 mbar. In an example embodiment, it is provided that the pressure in the process chamber does not exceed 600 to 700 mbar during the process of thermally breaking down the energy storage devices before the process chamber or the energy storage devices located therein cools down, and the process chamber is ventilated and then opened to remove the thermally broken down energy storage devices. What occurs with this pressure increase in the process chamber during the thermal breakdown of the energy storage devices is that an atmosphere is formed within the process chamber and thus in the environment in which the energy storage devices to be thermally broken down are located. It has surprisingly been shown that such a pressure increase in the second process step during the thermal breakdown method can significantly reduce the process time period for the thermal breakdown. This is traced to the atmosphere then located in the process chamber, which then causes mutual thermal influence by way of heat transfer. This process is also assisted by the accompanying convection that circulates the process gases. The circulation (convection) generated by the heating promotes the heating process again in terms of shortening the required process time. In this second process step, the energy storage devices are fully discharged due to the disintegration of the separators as a result of the associated short circuits. This takes place as an exothermic reaction, specifically in each energy storage device with a different heat yield due to a different design and/or different residual charge contained therein.

Due to the atmosphere between the individual energy storage devices, the heating process is balanced out within a batch of energy storage devices to be broken down. This has an effect on the heating of those energy storage devices, the exothermic residual discharge of which delivers less heat. At the same time, the presence of the atmosphere requires cooling of those energy storage devices which otherwise react very violently without an atmospheric environment due to their design and/or their residual charge. Therefore, the measure of the pressure increase in the second process step simultaneously controls the process temperature. In particular, temperature peaks are also suppressed in individual energy storage devices.

The process chamber can be heated in different ways. It is entirely possible to heat the process chamber inductively. However, for reasons of cost, indirect heating is preferred, namely by heating the furnace wall. According to one embodiment, it is provided that the furnace wall is heated electrically, specifically by radiant heaters which are arranged at a short distance from the retort or are integrated into or attached to the outside of the retort. Due to different compositions of energy storage devices to be thermally broken down in a batch in the process chamber having different contents of ferromagnetic materials, this is also a reason for different heating of the energy storage devices to be broken down in a batch. Due to the heat transfer between the individual energy storage devices provided by this method, the required process time is also shorter because it does not have to contain a safety time interval. This is necessary with conventional methods in order to ensure that every energy storage device contained in such a batch is pyrolytically broken down, e.g. even one that contains only a small ferromagnetic component. Due to the mutual heating as a result of the heat transfer possible by way of the existing atmosphere, energy storage devices that contain only a relatively small amount of ferromagnetic material or even no ferromagnetic material are brought to the desired heating temperature in a short time.

The pressure increase during the second process step in the case of the thermal breakdown of the electrochemical energy storage devices additionally has the advantage that the forming atmosphere is a reducing atmosphere. The substances required for the production of the reducing atmosphere are produced during the thermal treatment from the energy storage devices. The reducing atmosphere is therefore created by the produced process gases themselves, but remains in the process chamber up to the desired pressure maximum. As a result of the reducing atmosphere, care must be taken to ensure that at least the majority of the quantity of the metals contained in the energy storage devices, such as aluminum, iron, nickel, and cobalt, do not form oxide compounds. At least iron, nickel, and cobalt, if not present as oxides, can easily be separated by way of magnetic separation in the course of the downstream processing to separate the valuable material fractions from the material comminuted in the course of the processing. A process step of breaking down the metal oxides, which is otherwise required in the downstream processing, is therefore no longer required or only required for a smaller fraction of the metals, which has a cost-reducing effect on the recycling process. Against the background that the gas components required to cause the reducing atmosphere are created overall, or at least largely by the thermal treatment of the energy storage devices themselves, the degree of the reducing atmosphere can be set via the pressure by setting the volume flow aspirated from the process chamber of the furnace. If the reducing gases produced by the thermal treatment of the energy storage devices in the process chamber are not sufficient to cause the desired reducing environment, a reducing agent, typically in gaseous form, can be introduced into the treatment chamber from the outside.

The circulation of the process gases forming the atmosphere within the process chamber can be assisted by a corresponding circulation unit, for example a fan or the like. This assists the mutual heating or cooling of the energy storage devices through heat transfer.

A special feature of the method is that the thermal breakdown of the energy storage devices is carried out in two successive process steps, wherein the energy storage devices are brought to a temperature level in the first process step so that the electrolytes contained therein evaporate and the energy storage devices are opened due to the resulting vapor pressure. In this first process step, the energy storage devices are heated to a temperature, typically of approximately 160 to 200° C. As a result of the negative pressure built up during this first process step, which is typically less than 10 mbar, the electrolyte vapors emerging from the energy storage devices can be aspirated via a suction device connected to the process chamber and reclaimed by condensation. Typically, a vacuum condenser will be used for this, preferably operated by the same vacuum pump with which the negative pressure desired in the process chamber is also generated. The decomposition products, for example hydrocarbons, which are only produced upon further heating in the second process step, can then be reclaimed at least extensively separately from the electrolytes. With such a design of the method, it is advantageous that the gaseous evaporation and decomposition products of the energy storage devices are not created more or less simultaneously, as is the case with previously known methods, but rather in chronological succession and thus also can be fed independently of one another to process exhaust gas processing, in particular also to reclaim components contained therein. The electrolyte material evaporating in the first process step is, for example, ethyl methyl carbonate, ethylene carbonate, and/or dimethyl carbonate.

The thermal treatment is preferably carried out up to a maximum heating temperature which is less than the melting temperature of the lowest-melting-point element to be reclaimed from the group of metals and transition metals contained in the energy storage devices. Aluminum is typically contained in such energy storage devices. From the group of metals to be reclaimed—Al, Ni, Fe, Co—aluminum is the metal having the lowest melting point. Therefore, this maximum heating temperature of the electrochemical energy storage devices in the treatment chamber is restricted to a temperature that is less than the melting temperature of aluminum. In one embodiment of the method, the energy storage devices to be thermally broken down are only brought to a maximum temperature of approximately 600° C.

When carrying out the method, it is provided that the pressure increase in the process chamber is monitored during the second process step so that it increases continuously. It is useful if the rate of the pressure increase in a first phase of the second process step is greater than in the subsequent phase or phases. Typically, the pressure in the process chamber will be controlled in such a way that the pressure increase rise after a first pressure increase phase in the second process step is asymptotically brought toward the desired pressure or brought up to the process pressure and held at this for a certain time period.

A process exhaust gas purification system connected to the process chamber may comprise an injection condenser and a vacuum condenser connected downstream of this in the flow direction of the process exhaust gases. The vacuum condenser capacitor is used to reclaim electrolyte material contained in the process exhaust gases. The injection condenser is used for exhaust gas purification, in particular to remove hydrofluoric acid (HF) from the process exhaust gas that is produced during the thermal decomposition. The series connection of the injection condenser and the vacuum condenser is possible due to the two-step process management, in which, as a result of the thermal treatment of the electrochemical energy storage devices in the process chamber, the electrolytes first evaporate in the first process step, while hydrofluoric acid vapors only occur in the second process step with the decomposition of the other components, in particular the PVDF-based adhesives, using which the cathode metals are adhesively bonded to the aluminum cathode. In order to reclaim electrolytes from the process exhaust gas flow, the injection condenser is not operated during the first process step. It is only switched on when no more electrolytes are to be obtained from the process exhaust gas, and thus at the end of the first or at the beginning of the second process step. Electrolytes still contained in the exhaust gas flow are removed from the exhaust gas flow via the injection condenser. In such a process exhaust gas purification system connected to the process chamber, the units—process chamber, injection condenser, and vacuum condenser—are connected in series. Only a single vacuum pump is then required for operation.

In addition to aspects and embodiments described above, further aspects and embodiments will become apparent by reference to the appended drawings.

BRIEF DESCRIPTION OF THE DRAWINGS

The following descriptions are provided on the basis of an example embodiment with reference to the appended figures, wherein.

It is to be understood that the invention is not limited in application to the details of particular arrangements shown, since the invention is capable of other embodiments. Embodiments and figures disclosed herein are to be considered illustrative rather than limiting. Also, terminology used herein is for the purposes of description and not limitation.

DETAILED DESCRIPTION

Figure 1:
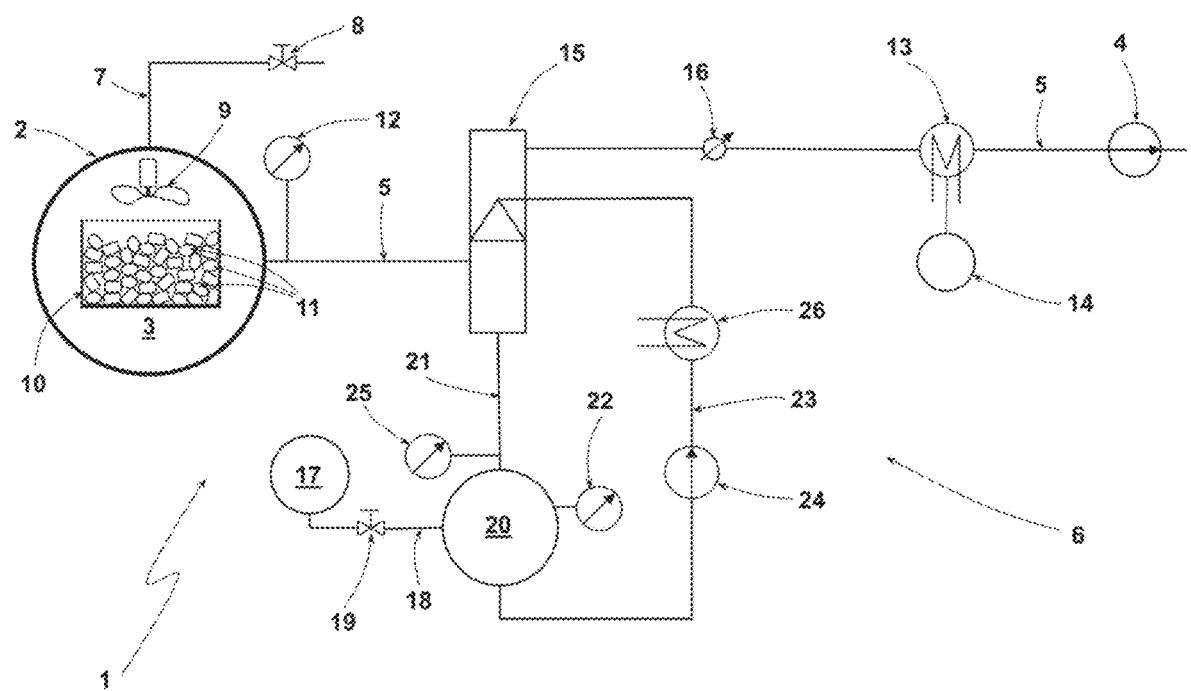
FIG. 1 shows a schematic block diagram of a thermal treatment system for the thermal breakdown of electrochemical energy storage devices.

With reference to FIG. 1, a thermal treatment system 1 comprises a vacuum furnace 2, which can be heated indirectly by an electrical heating device in the illustrated embodiment. A vacuum pump 4 is used to operate the vacuum furnace 2, i.e. to evacuate its process chamber 3. This vacuum pump is connected via a suction line 5 to the vacuum furnace 2. Process exhaust gas processing system, identified as a whole by the reference number 6, by which the process gases withdrawn from the process chamber 3 of the vacuum furnace 1 are processed, is connected into the suction line 5. A pressure control valve 16 is also connected into the suction line 5 downstream of the process exhaust gas processing 6. An inert gas feed line 7 opens into the process chamber 3 of the vacuum furnace 2, into which a valve 8 for controlling an inert gas feed into the process chamber 3 is connected. The valve 8 is electrically actuatable. The valve 8 is connected in a way not shown in detail to a control unit which controls the operation of the thermal treatment system 1. The vacuum furnace 2 has a fan 9 for circulating the process gases produced in the process chamber 3 during the thermal breakdown of energy storage devices located therein. The fan 9 is preferably located behind a facing of the process chamber 3, for example provided by a grid. In the illustrated embodiment, the fan 9 is located in the upper region of the process chamber 3. The gas flow generated by the fan 9 is directed downwards. In the process chamber 3, there is a receptacle (not shown in detail) for receiving a container 10 containing a large number of electrochemical energy storage devices, such as lithium-ion batteries—also of different types. The container 10 is a so-called pallet cage. The container 10 of the illustrated embodiment is open on the top, but designed to be closed in the region of its side walls and its bottom. Thus, process gases created as a result of the thermal treatment of the energy storage devices or emerging from them can escape upward. It is also entirely possible to use a container having perforated side walls and/or a perforated base.

The energy storage devices 11 contained in the container 10 represent a batch of energy storage devices 11 to be thermally broken down. A pressure measurement sensor 12 for detecting the pressure prevailing in the process chamber 3 is arranged in fluid communication with the process chamber 3. In the illustrated embodiment, the pressure measurement sensor 12 is connected to the first section of the suction line 5.

For the thermal breakdown of a batch of electrochemical energy storage devices 11, these are placed in a container 10 and then the container 10 having the energy storage devices 11 is placed in the process chamber 3 of the vacuum furnace 2. The energy storage devices 11 contained in the container 10 are of different designs and therefore have a different residual charge. The energy storage devices 11 are not completely discharged. If the container 10 having its energy storage devices 11 is inserted into the process chamber 3, the vacuum furnace 2 is closed.

Figure 2:
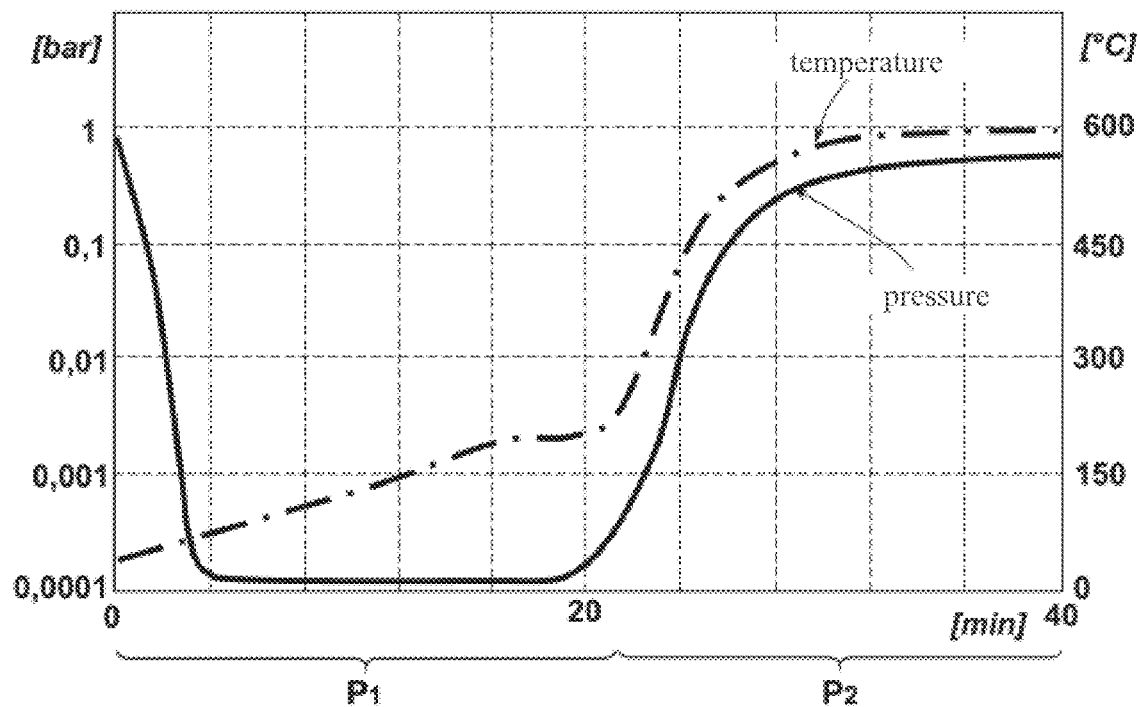
FIG. 2 shows a pressure-temperature-time diagram for illustrating the process management of the thermal breakdown of the electrochemical energy storage devices in the vacuum furnace of the thermal treatment system of FIG. 1.
Figure 3:
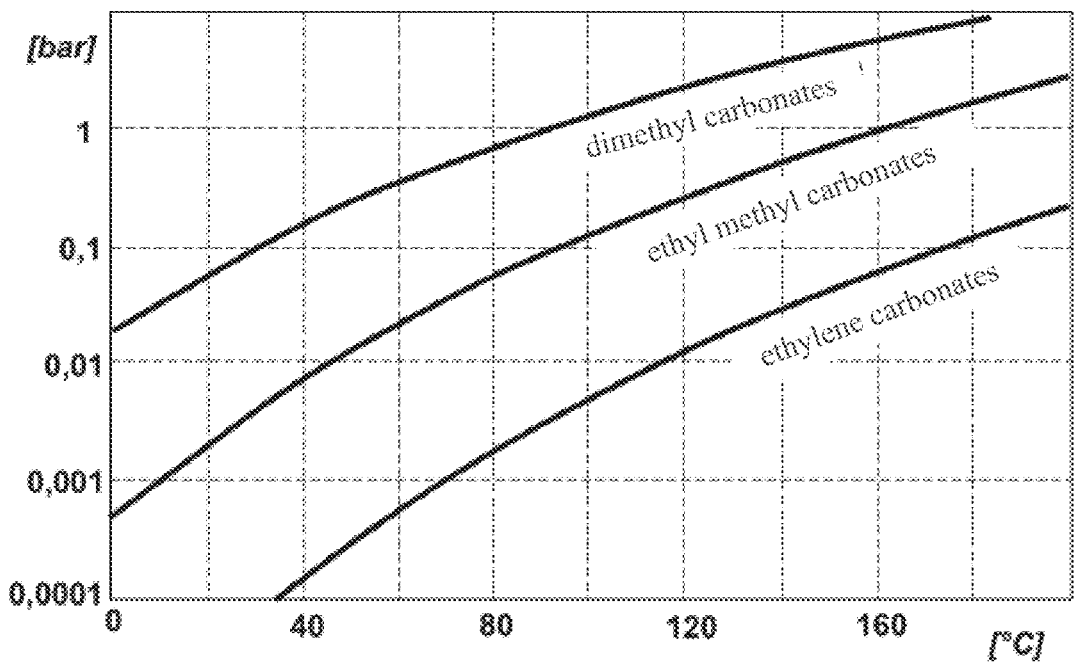
FIG. 3 shows a diagram illustrating the evaporation pressure as a function of the temperature of various electrolytes contained in electrochemical energy storage devices.

The process chamber 3 is then evacuated by operating the vacuum pump 4. During this time, the units of the process exhaust gas processing 6 are not in operation. At the same time, the energy storage devices 11 contained in the container 10 are heated. The pressure reduction in the process chamber 3 and the temperature increase of the energy storage devices 11 located therein can be seen in the diagram of FIG. 2. The first process step $P_1$ is started with the evacuation and the beginning of the process of heating. In this first process step $P_1$, the pressure is reduced and the energy storage devices 11 are heated to such an extent that the electrolytes contained therein—ethylene carbonates, dimethyl carbonates, and ethyl methyl carbonates—evaporate. The pressure in the process chamber 3 is reduced to less than 10 mbar, approximately to 5 to 7 mbar. The negative pressure is used so that the electrolytes contained in the energy storage devices evaporate even at low temperatures and thus even with little heating. In the diagram of FIG. 3, the evaporation curves of the three above-mentioned electrolytes are shown by way of example. The vapor pressure produced in this way within the closed energy storage devices 11 opens them. Depending on the design of the energy storage devices 11, this is done by opening the safety valves, the pole covers, or the housing (in the case of pouch cells). As a result, process exhaust gases containing the vaporized electrolytes in the vapor phase are produced within the process chamber 3. As a result of the suction operation via the vacuum pump 4, these gases are aspirated from the process chamber 3 via the suction line 5. Beginning at a temperature at which the electrolytes begin to evaporate, a vacuum condenser 13 (surface condenser) connected into the suction line 5 is put into operation in order to reclaim electrolytes contained in the process exhaust gases. These are collected in an electrolyte collecting tank 14 connected to the vacuum condenser 13. In order to ensure that all of the energy storage devices 11 contained in the container 10 are opened by the evaporation of the electrolytes contained therein at the end of the process step $P_1$, the temperature is kept at a temperature for a short time, in the illustrated embodiment at approximately 200° C. The temperature holding time ensures that all of the energy storage devices 11 contained in the container 10 are opened by the evaporation of the electrolytes contained therein and that the electrolyte is evaporated. The temperature holding time can be a predefined time span, determined for example from studies. The evaporation process of the electrolytes in the process chamber 3 can also be monitored via the reclamation of the electrolytes at the vacuum condenser 13 via the amount of condensed electrolyte per unit of time. This can be used to allow the temperature holding time at the end of the first process step $P_1$ to last until the electrolyte deposition rate falls below a predetermined lower limiting value.

The second process step $P_2$ begins with a temperature increase for further thermal treatment of the electrochemical energy storage devices 11 by appropriate actuation of the furnace heater. Due to the further heating of the energy storage devices 11, the separators contained therein are decomposed. As a result, internal short circuits take place in the energy storage devices 11, as a result of which the energy storage devices 11 are completely discharged. This becomes noticeable in a further temperature increase within the process chamber 3. At the end of process step $P_1$ or at the beginning of process step $P_2$, the vacuum pump 4 is switched off with the result that a pressure builds up inside the process chamber 3, as can be seen in the diagram of FIG. 2. Alternatively, the pressure control valve 16 can also be closed. As a result, an atmosphere formed from the process gases is produced in the process chamber 3. Due to the chemical nature of the substances involved in the composition of the process gases, this atmosphere is reducing. The further pyrolytic breakdown of the energy storage devices 11 in a reducing atmosphere is desired in this method so that the metals released by the decomposition process do not form oxidic compounds as much as possible. Studies have shown that this measure of pyrolytic breakdown in a reducing atmosphere significantly reduces the proportion of metal oxides in the pyrolytically broken down material in comparison to other breakdown methods. In the downstream processing, at least a majority of the non-oxide metal compounds may be separated from the broken down material in a simple manner by a magnetic separator after a preceding comminution process.

In the illustrated embodiment, the inert gas feed line 7 is only provided for safety reasons so that in the event of an unexpectedly violent reaction in the process chamber 3, it can be flooded with inert gas.

In addition to this advantage, the atmosphere forming in the process chamber 3 also promotes the mutual heating of the energy storage devices 11 in the container 10 as a result of the convection occurring in the container 10. A circulation of the process gases in the container 10 is assisted by operation of the fan 9, which is located above the opening on the top of the container 10 in the process chamber 3 and the airflow of which is directed in the direction towards the energy storage devices 11. The circulation of the process gases provided by the heat and, in the illustrated embodiment, also by the operation of the fan 9, is used as a heat carrier in order to equalize the heating of the individual energy storage devices 11. Depending on their degree of heating, these emit heat to the surrounding process gas atmosphere, as a result of which heat is supplied to those energy storage devices 11 which have a lower temperature than the temperature of the process gases. This takes place against the background that the heat generated by the residual discharge in each energy storage device 11 is different.

In the illustrated embodiment, the pressure increase is monitored, specifically that it ends at approximately 600 mbar. In order to maintain this residual negative pressure in relation to the ambient pressure, the vacuum pump 4 is operated accordingly.

The temperature increase is monitored to ensure that it does not exceed a temperature of approximately 600° C., against the background that melting of aluminum, the metal having the lowest melting point from the group of secondary raw materials to be recycled, does not melt. At the end of process step $P_1$ or at the beginning of process step $P_2$, the vacuum condenser 13 is deactivated and an injection condenser 15 connected upstream of vacuum condenser 13 in the flow direction of the process exhaust gases is activated. During process step $P_1$, the injection condenser 15 is deactivated, so that the process exhaust gases flowing through the suction line 5 are passed through the injection condenser 15 without being influenced by it. A further pressure measurement sensor 16 for monitoring pressure in the suction line 5 is located between the injection condenser 15 and the vacuum condenser 13.

The injection condenser 15 which is in operation in second process step $P_2$ is used to purify the process exhaust gases, in particular to remove hydrofluoric acid contained therein in vapor form. The injection condenser 15 is operated using an alkaline solution that is stored in an alkaline solution tank 17. In the illustrated embodiment, sodium hydroxide solution is used as the alkaline solution. The alkaline solution tank 17 is connected via a line 18 with a valve 19 interconnected to a collecting tank 20, into which the condensates produced in the injection condenser 15 are introduced via a condensate line 21. The collecting tank 20 is equipped with a level detection unit 22. The outlet of the collecting tank 20 is connected to the injection connection of the injection condenser 15 via an injection line 23. A pump 24 is used to convey the alkaline solution. The pH value of the condensate emerging from the injection condenser 15 is detected via a pH meter 25. The pH meter is connected to the condensate line 21. In accordance with the measured pH value of the condensate flowing through the condensate line 21, alkaline solution is introduced from the alkaline solution tank 17 into the collecting tank 20 in order to neutralize the hydrofluoric acid and to have an injection liquid that is approximately neutral.

A heat exchanger 26 is connected downstream of the pump.

The exhaust gases purified by the injection condenser 15 can then, if necessary, be fed to a thermal post-combustion to remove the hydrocarbons contained therein and the cracking products of the separators, which are typically manufactured from PP or PE.

If desired, hydrocarbons can also be removed from the process exhaust gas stream in process step $P_2$.

After the pyrolytic breakdown has ended, the broken down energy storage devices 11 are cooled and the process chamber 3 is ventilated before it is opened and the container 10 is removed. The vacuum furnace 2 can then be equipped with the next batch of energy storage devices for their pyrolytic breakdown.

With the thermal treatment system 1, the process duration for the desired pyrolytic breakdown of the energy storage devices is reduced by approximately 30% in comparison to conventional methods due to the special pressure-temperature management within the process chamber 3 of the vacuum furnace 2. Consequently, the throughput that can be achieved with a single vacuum furnace 2 is correspondingly higher. In addition, due to the reducing atmosphere within the process chamber 3 in second process step $P_2$, the non-metal oxide component in the pyrolytically broken down material is significantly higher than in conventional processes, which has an advantageous effect on the downstream treatment. Then, after a preceding mechanical comminution, the metals to be reclaimed as secondary raw materials, which are in a non-oxide compound and typically have ferromagnetic properties, can be separated in a simple and effective manner from the thermally broken down material by a magnetic separator.

The invention has been described on the basis of an example embodiment and aspects thereof. Without leaving the scope of the claims, numerous further embodiments, modifications, permutations, additions, combinations and subcombinations therefor result for a person skilled in the art for implementing the invention, without these having to be described in detail in the scope of these statements. The claims should therefore be interpreted to include all such embodiments modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown or described, or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are hereby incorporated into this disclosure. When a Markush group or other grouping is used herein, all individual members of the group and all combinations and sub-combinations possible of the group are hereby individually included in this disclosure.

In general, the terms and phrases used herein have their art-recognized meaning, which can be found by reference to standard texts, references and contexts known to those skilled in the art. The above definitions are provided to clarify their specific use in the context of the invention.

LIST OF REFERENCE SIGNS

1 thermal treatment system
2 vacuum furnace
3 process chamber
4 vacuum pump
5 suction line
6 process exhaust gas processing
7 inert gas feed line
8 valve
9 fan
10 container
11 energy storage device
12 pressure measurement sensor
13 vacuum condenser
14 electrolyte collecting tank
15 injection condenser
16 pressure control valve
17 alkaline solution tank
18 line
19 valve
20 collecting tank
21 condensate line
22 fill level detecting unit
23 injection line
24 pump
25 pH meter
26 heat exchanger
$P_1$ first process step
$P_2$ second process step

The invention claimed is:

1. A method for breaking down electrochemical energy storage devices in conjunction with a subsequent reclamation of recyclable materials contained therein as secondary raw materials, wherein the energy storage devices are broken down by thermal treatment in a negative pressure environment in a process chamber to remove electrolyte and reactive substances, before thermally treated material is subjected to downstream processing by which the secondary raw materials in the thermally treated material are separated from one another, comprising:

in a first process step after introducing a batch of energy storage devices to be thermally broken down into the process chamber, evacuating the process chamber while simultaneously heating the energy storage devices to a first temperature level such that electrolytes contained in the energy storage devices evaporate and, due to resulting vapor pressure, the energy storage devices are opened, wherein produced process gases containing electrolytes in the vapor phase are withdrawn from the process chamber, and in a second process step following the first process step, the energy storage devices are heated in a reducing atmosphere to a second temperature level with simultaneous pressure increase in the process chamber for the further breakdown, wherein the pressure increase in the process chamber is monitored during the second process step so that it rises continuously, and thereafter the process chamber is ventilated, cooled, and the energy storage devices are removed.

2. The method of claim 1, wherein the rate of pressure increase at the beginning of the second process step is greater than in subsequent phases of the second process step.

3. The method of claim 1, wherein in the first process step, the process chamber is evacuated to a negative pressure of less than 10 mbar in comparison with the ambient pressure.

4. The method of claim 1, wherein in the first process step, the storage devices contained in the process chamber are heated to a temperature of approximately 160 to 200° C.

5. The method of claim 1, wherein the pressure inside the process chamber is monitored during the second process step so that it does not exceed 600 to 700 mbar.

6. The method of claim 1, wherein process gases are actively circulated inside the process chamber during the second process step.

7. The method of claim 1, wherein the temperature inside the process chamber is monitored so that it does not exceed 600° C.

8. The method of claim 1, wherein process gases produced during thermal treatment are aspirated from the process chamber.

9. The method of claim 1, wherein electrolytes are reclaimed from the process gases containing electrolytes in the vapor phase and aspirated from the process chamber during the first process step.

10. The method of claim 1, wherein the process gases withdrawn from the process chamber are conducted via an injection condenser by which, when switched on, pollutants carried along in the process gases are removed.

11. The method of claim 10, wherein electrolytes are reclaimed from the process gases containing electrolytes in the vapor phase and aspirated from the process chamber during the first process step.

12. The method of claim 11, wherein the electrolytes from the process gases withdrawn from the process chamber during the first process step are separated from a process exhaust gas stream by a vacuum condenser connected downstream of the injection condenser in the flow direction of the process gases, wherein the injection condenser is not in a condensation mode during the first process step.

* * * * *